(12) United States Patent
Uebuchi et al.

(10) Patent No.: US 10,606,995 B2
(45) Date of Patent: Mar. 31, 2020

(54) CHARACTER INPUT DEVICE, CHARACTER INPUT METHOD, AND CHARACTER INPUT PROGRAM

(71) Applicant: OMRON Corporation, Kyoto-shi, Kyoto (JP)

(72) Inventors: Takao Uebuchi, Kyoto (JP); Takuya Nakayama, Kyoto (JP)

(73) Assignee: OMRON Corporation, Kyoto-shi (JP)

( * ) Notice: Subject to any disclaimer, the term of this patent is extended or adjusted under 35 U.S.C. 154(b) by 206 days.

(21) Appl. No.: 15/869,294

(22) Filed: Jan. 12, 2018

(65) Prior Publication Data

US 2018/0268118 A1 Sep. 20, 2018

(30) Foreign Application Priority Data

Mar. 15, 2017 (JP) ................................ 2017-049518

(51) Int. Cl.
*G06F 21/32* (2013.01)
*G06F 21/62* (2013.01)
*G06F 40/242* (2020.01)
*G06F 40/274* (2020.01)
*G06F 21/84* (2013.01)
*G06F 3/023* (2006.01)

(52) U.S. Cl.
CPC .......... *G06F 21/32* (2013.01); *G06F 21/6245* (2013.01); *G06F 21/84* (2013.01); *G06F 40/242* (2020.01); *G06F 40/274* (2020.01); *G06F 3/0237* (2013.01)

(58) Field of Classification Search
CPC ........ G06F 21/32; G06F 21/84; G06F 17/276; G06F 17/2735; G06F 3/0237; G06F 21/6245
See application file for complete search history.

(56) References Cited

U.S. PATENT DOCUMENTS

| | | | |
|---|---|---|---|
| 7,020,270 B1* | 3/2006 | Ghassabian | G06F 1/1616 341/22 |
| 9,996,524 B1* | 6/2018 | Hwang | H04W 4/14 |
| 10,140,502 B1* | 11/2018 | Shilo | H04L 9/3231 |
| 2008/0291059 A1 | 11/2008 | Longe | |
| 2014/0163954 A1 | 6/2014 | Joshi et al. | |

(Continued)

FOREIGN PATENT DOCUMENTS

WO 01/31788 A1 5/2001
WO 2016/112056 A1 7/2016

OTHER PUBLICATIONS

The extended European search report dated Jul. 6, 2018 in the counterpart European patent application.

*Primary Examiner* — Michael R Vaughan
(74) *Attorney, Agent, or Firm* — Metrolex IP Law Group, PLLC (57) ABSTRACT

A character input device is provided with an operation unit that accepts key input and displays and accepts selection of a prediction candidate according to the result of the key input, and a character input determining unit that determines an input character, using the result of the key input or the selection result of the prediction candidate. Also, the character input determining unit executes fingerprint authentication at the time of accepting the key input or the time of selecting the prediction candidate.

8 Claims, 6 Drawing Sheets

(56) References Cited

U.S. PATENT DOCUMENTS

| | | | |
|---|---|---|---|
| 2015/0025876 A1* | 1/2015 | Ghassabian | G06F 40/274 |
| | | | 704/9 |
| 2015/0036065 A1 | 2/2015 | Yousefpor et al. | |
| 2015/0074615 A1* | 3/2015 | Han | G06K 9/00033 |
| | | | 715/863 |
| 2018/0211258 A1* | 7/2018 | Buis | G06Q 20/40145 |
| 2018/0262491 A1* | 9/2018 | Liu | G06F 21/32 |

* cited by examiner

CHARACTER INPUT DEVICE, CHARACTER INPUT METHOD, AND CHARACTER INPUT PROGRAM

CROSS-REFERENCES TO RELATED APPLICATIONS

This application claims priority to Japanese Patent Application No. 2017-049518 filed Mar. 15, 2017, the entire contents of which are incorporated herein by reference.

FIELD

The disclosure relates to a character input technology provided with a function of utilizing fingerprint authentication.

BACKGROUND

Technologies for performing fingerprint authentication at the time of using a mobile communication terminal or the like and securing the security of the mobile communication terminal are known, as shown in US 2015/0036065A.

US 2015/0036065A is an example of background art.

However, in the case where the technology shown in US 2015/0036065A is used, some of the functions that are installed in the mobile communication terminal can be utilized for a given period during which the security of the mobile communication terminal is disabled.

Note that a user may input private information, such as an e-mail password, a credit card number or the like, for example, using a mobile communication terminal. When the user inputs the same character a plurality of times in the case where the user has set private information as the learning target, the learning function that character input is provided with will learn the private information.

As a result, the learned character will be displayed as a prediction candidate, by inputting part of the character. In particular, in the case of sharing use of a mobile communication terminal or the like, there is a possibility that the learned character will be displayed as a prediction candidate of other users, giving rise to a problem in terms of privacy protection. Also, it is not efficient for the user to delete characters that have been explicitly learned.

Accordingly, one or more embodiments may efficiently perform character input that takes privacy protection into account.

SUMMARY

A character input device according to one or more embodiments is provided with an operation unit configured to accept key input, and to display and accept selection of a prediction candidate that depends on a result of the key input, and a character input determining unit configured to determine an input character, using the result of the key input or a selection result of the prediction candidate. The character input determining unit executes fingerprint authentication at a time of accepting the key input or a time of selecting the prediction candidate.

With this configuration, fingerprint authentication is executed, at the time of key input or prediction candidate selection.

Also, the operation unit is provided with an operation surface. The character input determining unit executes the fingerprint authentication, based on contact on the operation surface.

With this configuration, fingerprint authentication can be executed, at the same time as key input and candidate selection.

Also, the character input device according to one or more embodiments is provided with a candidate display unit and a private information saving unit. The character input determining unit, when the fingerprint authentication by the key input is successful, display a private candidate of the private information saving unit on the candidate display unit.

With this configuration, fingerprint authentication by key input is performed, and a private candidate is displayed when authentication is successful.

Also, the character input device according to one or more embodiments is provided with a candidate display unit and a private information saving unit. The character input determining unit displays the prediction candidate on the candidate display unit so as to be partly concealed, and, when the fingerprint authentication by selection of the prediction candidate is successful, outputs the prediction candidate externally.

With this configuration, when fingerprint authentication is successful as a result of the action of selecting a prediction candidate in which part of the character is concealed, the prediction candidate is output externally.

According to one or more embodiments, character input that takes privacy protection into account can be efficiently performed.

DETAILED DESCRIPTION

First Embodiment

Figure 1:
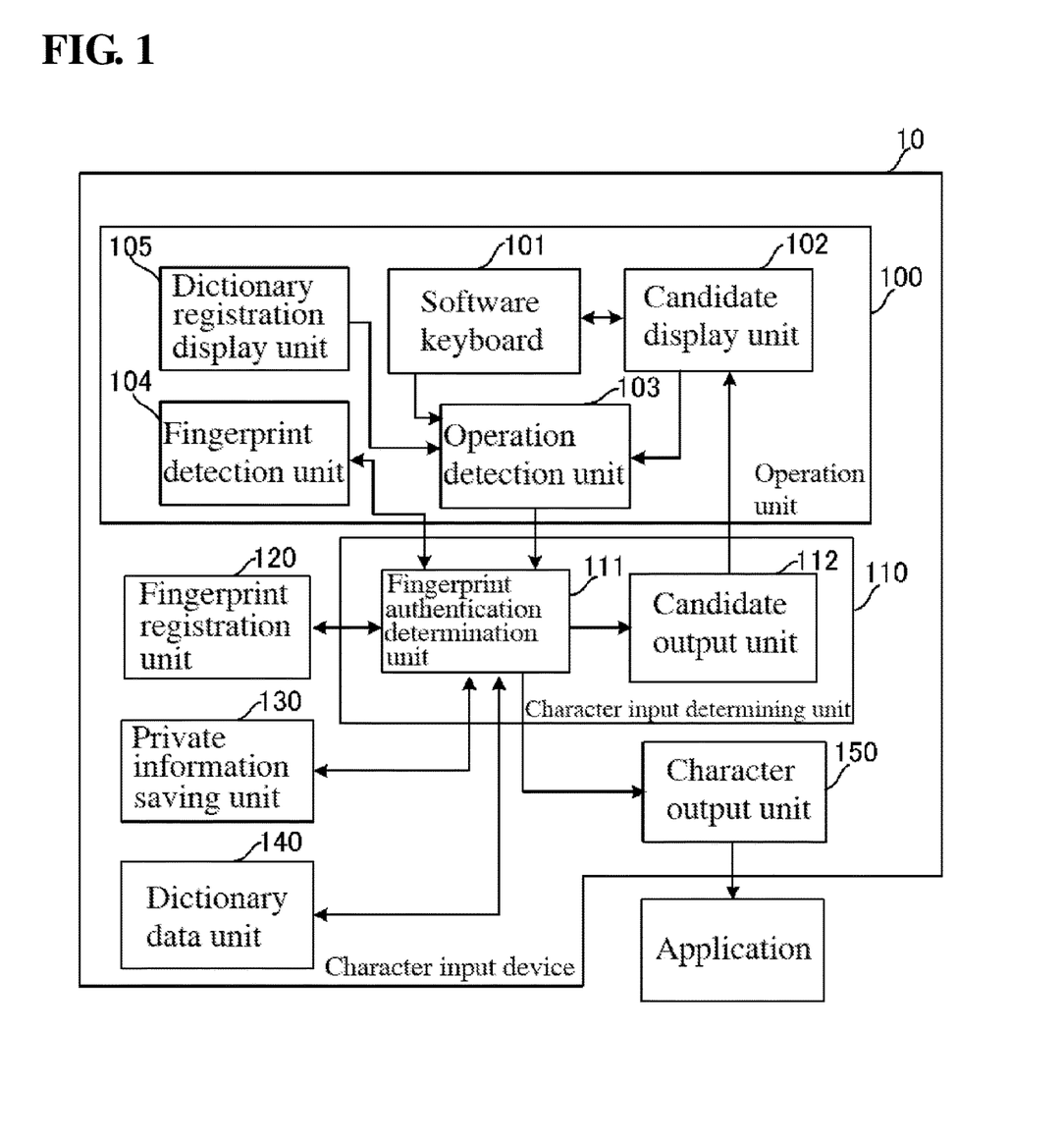
FIG. 1 is a block diagram illustrating a main configuration of a character input device according to a first embodiment.
Figure 2:
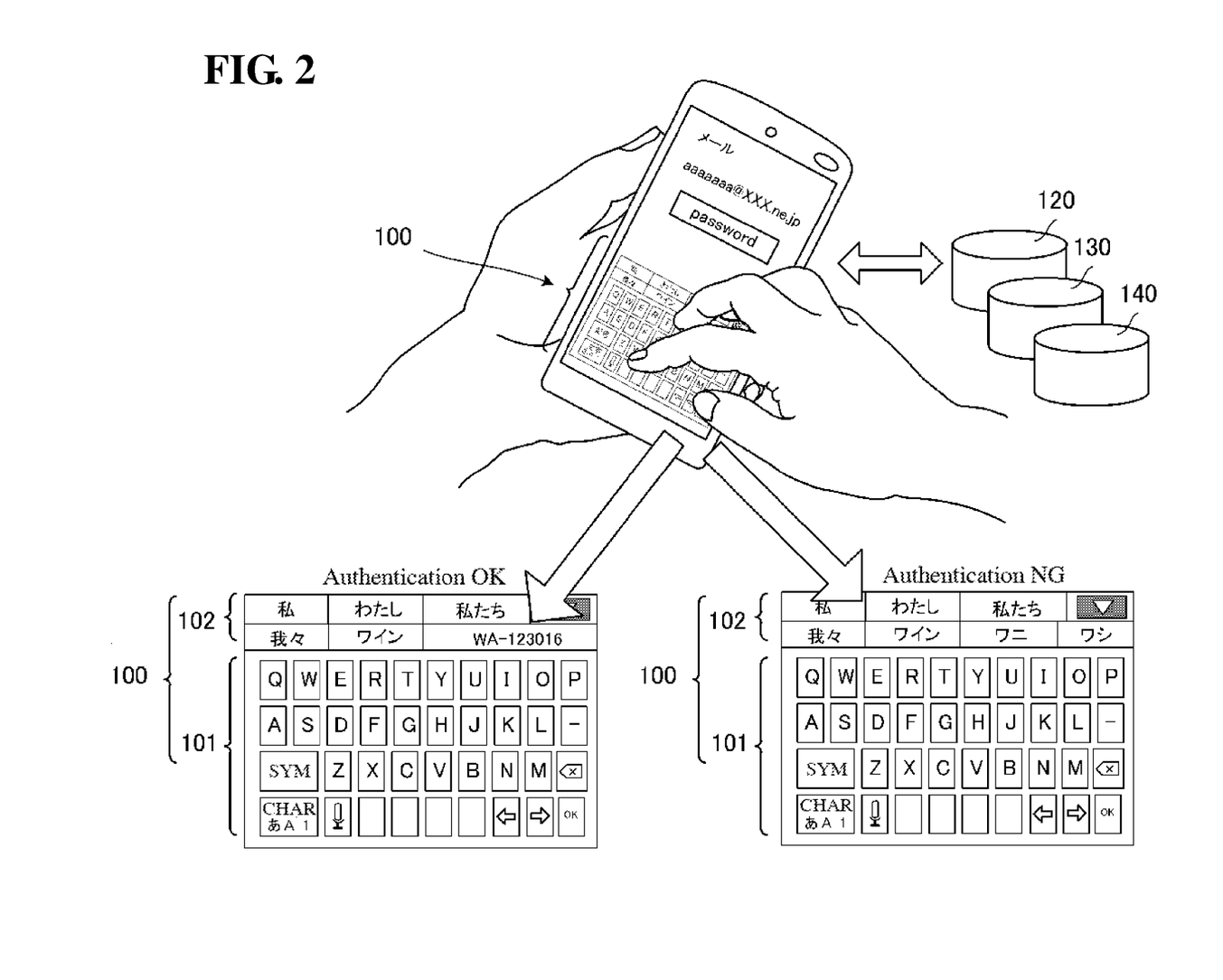
FIG. 2 is a schematic diagram illustrating an operation unit according to a first embodiment.

A character input device, a character input method and a character input program according to a first embodiment will be described, with reference to the drawings. FIG. 1 is a block diagram showing a main configuration of the character input device according to a first embodiment. FIG. 2 is a schematic diagram of an operation unit according to a first embodiment.

A character input device 10 according to one or more embodiments is used by a device that is able to perform operations and character input, by a user pressing a display screen such as a touch panel or the like that is included in a mobile communication terminal.

As shown in FIG. 1, the character input device 10 is provided with an operation unit 100, a character input determining unit 110, a fingerprint registration unit 120, a private information saving unit 130, a dictionary data unit 140 and a character output unit 150. The operation unit 100 is provided with a software keyboard 101, a candidate display unit 102, an operation detection unit 103, a fingerprint detection unit 104 and a dictionary registration display unit 105. The character input determining unit 110 is provided with a fingerprint authentication determination unit 111 and a candidate output unit 112.

The software keyboard 101 displays keys and accepts key input operations. The candidate display unit 102 displays candidates based on key input and accepts candidate selection operations. The operation detection unit 103 detects operations on the software keyboard 101 and the candidate display unit 102. The fingerprint detection unit 104 detects a fingerprint at the time of the user operating the software keyboard 101 and the candidate display unit 102. The dictionary registration display unit 105 displays a checkbox for selecting whether an input character is a word, a reading or private information to be registered in a dictionary.

The fingerprint authentication determination unit 111 accepts instructions of the operation detection unit 103 and the fingerprint detection unit 104, and performs processing on the candidate output unit 112, the fingerprint registration unit 120, the private information saving unit 130, the dictionary data unit 140 and the character output unit 150. The candidate output unit 112 transmits candidates to the candidate display unit 102, due to an instruction of the fingerprint authentication determination unit 111.

The fingerprint registration unit 120 saves fingerprints accepted from the fingerprint detection unit 104, due to an instruction of the fingerprint authentication determination unit 111. The private information saving unit 130 saves fingerprints saved in the fingerprint registration unit 120 and private information (private candidates, etc.) in association with each other. The dictionary data unit 140 saves prediction candidates, words, texts, and the like.

FIG. 2 is a schematic diagram showing an image in which the operation unit 100 has been activated by an application or the like. As shown in FIG. 2, the operation unit 100 is provided with the software keyboard 101 and the candidate display unit 102. As described above, the fingerprint detection unit 104 is provided with a function of detecting fingerprints.

A procedure for displaying and utilizing private information at the time of performing character input will be described, using FIGS. 1 and 2. As shown in FIG. 2, as a result of the user operating the software keyboard 101 with his or her finger, the fingerprint detection unit 104 detects the fingerprints of the user, and conveys the detected fingerprints to the fingerprint authentication determination unit 111. The fingerprint authentication determination unit 111 searches the fingerprint registration unit 120, the private information saving unit 130 and the dictionary data unit 140, based on the fingerprints of the user. Note that it is assumed that the dictionary data unit 140 includes dictionary data that enables character conversion and predictive conversion. Hereinafter, a prediction candidate that does not include private information will be referred to as a normal candidate, and a prediction candidate that includes private information will be referred to as a private candidate.

For example, the user activates an e-mail application of a mobile terminal, and enters a password, in order to read e-mails. The password is given as "WA-123016". The user operates the software keyboard 101 with his or her finger, and inputs "wa". At the time of this operation, the fingerprint detection unit 104 detects the fingerprints of the user. First, the fingerprint authentication determination unit 111 searches as to whether the fingerprints of the user are registered in the fingerprint registration unit 120.

In the case where the fingerprints are registered in the fingerprint registration unit 120 (in the case of fingerprint authentication OK), the fingerprint authentication determination unit 111 searches the private information saving unit 130, and passes the fingerprints to the candidate output unit 112. The candidate output unit 112 displays a character string "WA-123016" on the candidate display unit 102, as shown in the lower left of FIG. 2. Furthermore, the candidate output unit 112 extracts candidates that are predicted from the input "wa" from the search result of the dictionary data unit 140, and displays the extracted candidates on the candidate display unit 102.

In the case where the fingerprints are not registered in the fingerprint registration unit 120 (in the case of fingerprint authentication NG), the candidate output unit 112 extracts candidates that are predicted from the input "wa" from the result of having searched only the dictionary data unit 140, and displays the extracted candidates on the candidate display unit 102, as shown in the lower right of FIG. 2.

In the case where the fingerprints are registered in the fingerprint registration unit 120 (in the case of fingerprint authentication OK), the user is able to select a private candidate "WA-123016" displayed on the candidate display unit 102. In the case where the user selects this character string, the operation detection unit 103 detects this selection operation by the user. Next, the operation detection unit 103 transmits the character string "WA-123016" to the character output unit 150. The character output unit 150 outputs the character string "WA-123016" to the e-mail application.

As a result of this processing, it can be determined whether to display a character string as a prediction candidate, based on the fingerprints of the user, even in the case where private information is registered. Furthermore, in the case where the fingerprints of the user are registered, the user is able to select private information displayed as a prediction candidate, and to utilize the selected private information with an external application.

Accordingly, since the private information of the user can be protected, privacy is protected, even in the case where the user of a mobile terminal or the like changes.

Note that, in the abovementioned description, a mode in which the respective processing is executed by individual functional units was shown. However, the abovementioned processing may be realized and stored in the form of a program, and the program may be executed by a computational processing device such as a CPU. In this case, the flow of FIG. 3 need only be executed.

Figure 3:
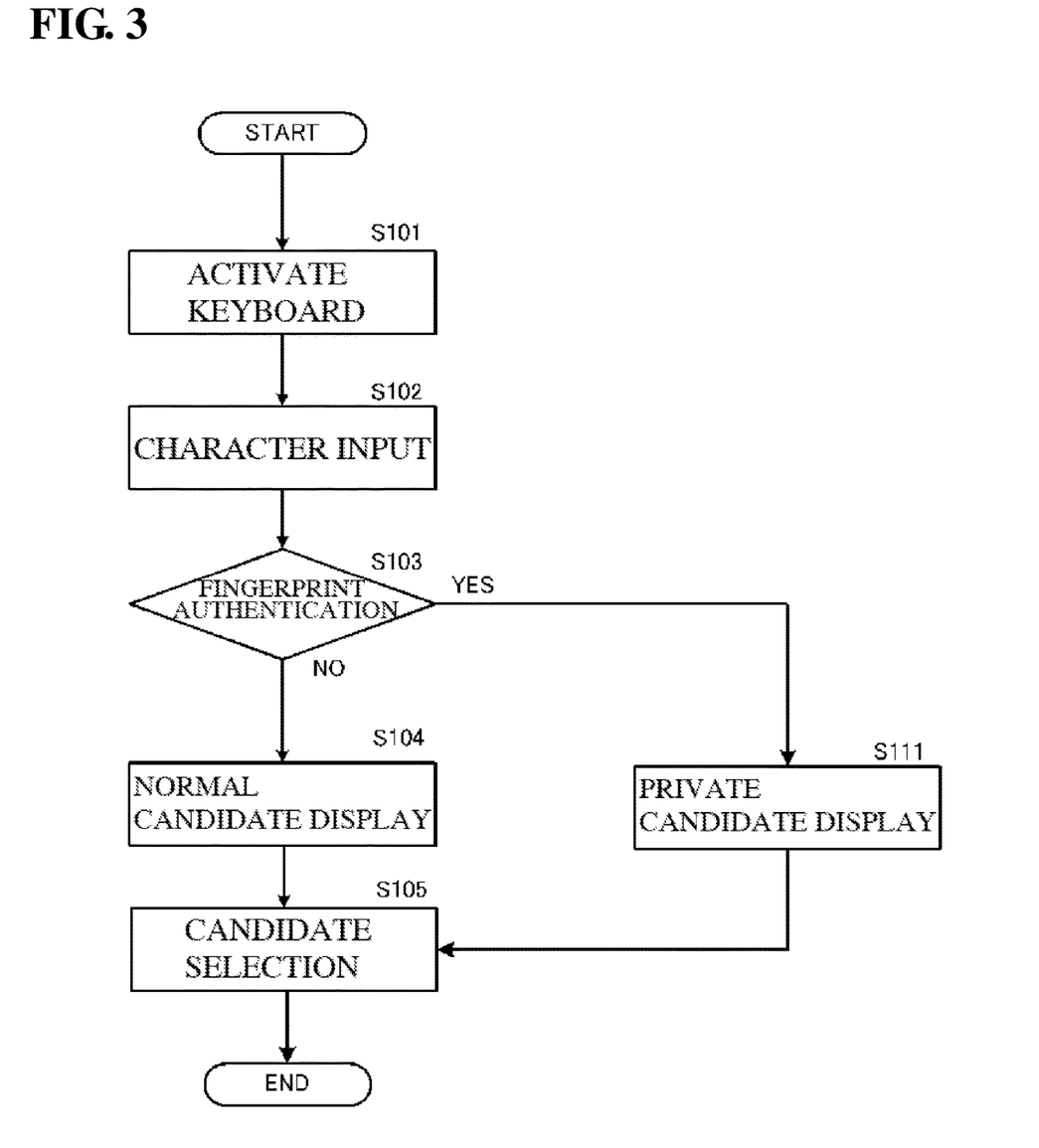
FIG. 3 is a flowchart illustrating a character input method according to a first embodiment.

FIG. 3 is a flowchart of a character input method according to a first embodiment. The computational processing device accepts activation of the software keyboard (S101). The computational processing device accepts an operation of the user inputting a character with his or her finger using the software keyboard (S102). The computational processing device detects the fingerprints of the user and authenticates whether the fingerprints are registered or not. If the fingerprints are registered (S103: Yes), the computational processing device searches for private information of the user, and displays a private candidate if a character string to serve as a candidate exists (S111). The computational processing device accepts an operation selecting an intended character string from the private candidate of the user (S105).

Note that if fingerprints are registered (S103: Yes), both private candidates and normal candidates are displayed as prediction candidates. The display order of candidates depends on the environment.

Also, if fingerprints are not registered (S103: No), the computational processing device retrieves normal candidates from dictionary data and displays the normal candidates (S104). The user selects an intended character string from the normal candidates (S105).

Figure 4A:
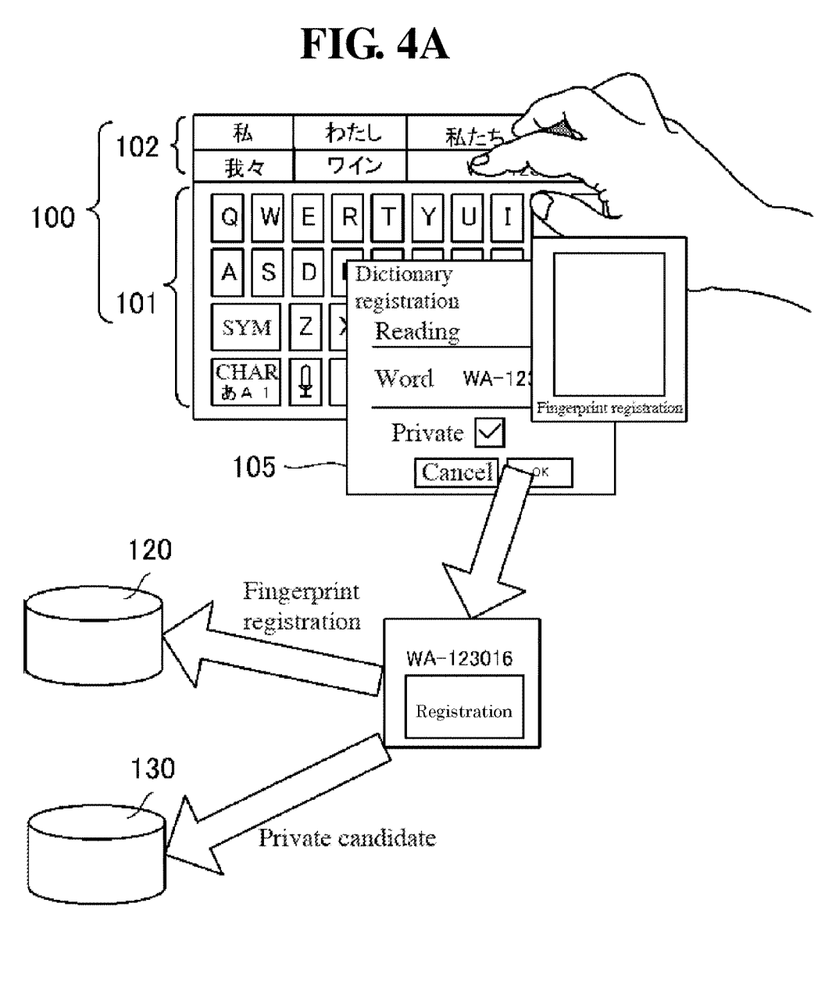
FIG. 4A is a schematic diagram illustrating a case at the time of registration using a candidate display unit according to a first embodiment.
Figure 4B:
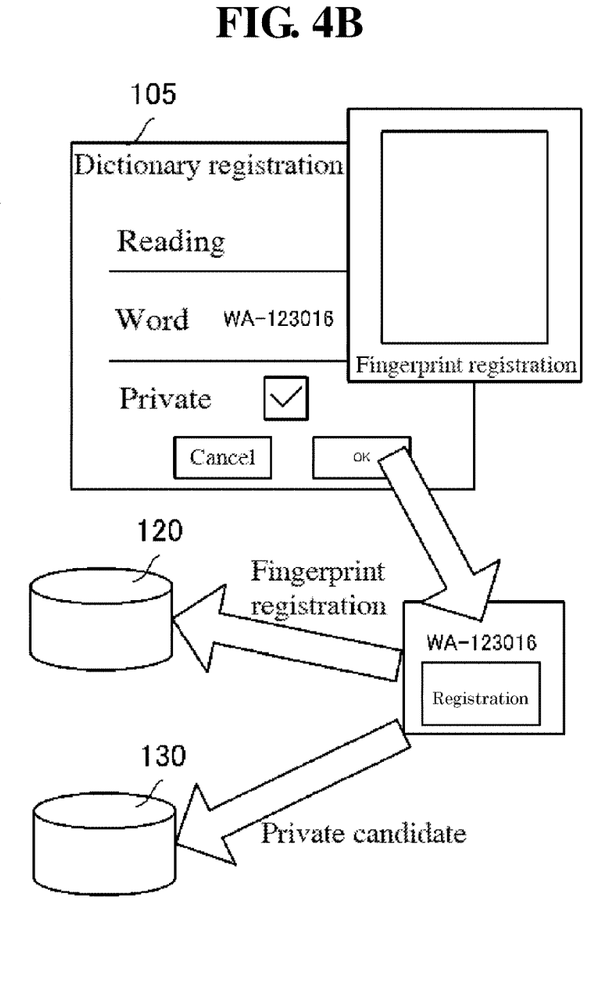
FIG. 4B is a schematic diagram illustrating a case at the time of registration using a dictionary registration display unit according to a first embodiment.

In the above description, a method was shown in which a private candidate is selected and utilized, in the case where fingerprint authentication is performed at the time of character input and authentication is successful. In FIGS. 4A and 4B, methods of registering a private candidate according to a first embodiment are shown.

As shown in FIG. 4A, the operation unit 100 is provided with the software keyboard 101 and the candidate display unit 102. Also, it is assumed that the operation unit 100 has been activated by an application that is not included in one or more embodiments. FIG. 4A is a diagram showing an image in which fingerprints are registered in the fingerprint registration unit 120 and a character string is registered in the private information saving unit 130, as a result of the user manipulating a character string that is displayed on the candidate display unit 102 with his or her finger.

FIG. 4A is a diagram showing a first method of registering private information. As shown in FIGS. 1 and 4A, the user uses the software keyboard 101, and inputs "wa" as an e-mail password. Note that it is assumed that a character string "WA-123016" is registered as a prediction candidate by the learning function of character input.

Normal candidates that are based on the input "wa" registered in the dictionary data unit 140 (refer to FIG. 1) are displayed on the candidate display unit 102. The normal candidates include "WA-123016" which is the password of the user. Therefore, "WA-123016" is predicted from the input "wa" and is displayed on the candidate display unit 102. However, the character string "WA-123016" which is the user's own e-mail password is, for the user, information that he or she does not want to reveal to other users.

Accordingly, the user registers the character string "WA-123016" as a private candidate. The user long-presses the normal candidate "WA-123016" on the candidate display unit 102. The operation detection unit 103 conveys to the fingerprint authentication determination unit 111 that the character string is a private character string of the user as a result of this operation. The fingerprint authentication determination unit 111 confirms that the normal candidate "WA-123016" is private information, and activates the dictionary registration display unit 105. The user inputs the reading of the word "WA-123016" that he or she wants to dictionary register to the dictionary registration display unit 105. The user checks the check box, in order to register "WA-123016" as a private candidate. Following this, the fingerprint authentication determination unit 111 prompts the user to perform fingerprint registration. The fingerprint detection unit 104 conveys the fingerprints of the user to the fingerprint authentication determination unit 111. The fingerprint authentication determination unit 111 registers the fingerprint in the fingerprint registration unit 120.

Next, the fingerprint authentication determination unit 111 registers the fingerprints in association with "WA-123016". As a result of this processing, the character string "WA-123016" is deleted from the normal candidates and is registered as a private candidate.

As a result of this processing, the user is able to register his or her own fingerprints in association with private candidates.

FIG. 4B is a diagram showing a second method of registering private information. The dictionary registration display unit 105 of the operation unit 100 (refer to FIG. 1) is activated using a button or the like.

The user activates the dictionary registration display unit 105. The user inputs the reading of the word "WA-123016" that he or she wants to dictionary register to the dictionary registration display unit 105. The user checks the check box, in order to register "WA-123016" as a private candidate. The operation detection unit 103 conveys to the fingerprint authentication determination unit 111 that the character string is a private character string of the user as a result of this operation. The fingerprint authentication determination unit 111 confirms that the normal candidate "WA-123016" is private information. Following this, the fingerprint authentication determination unit 111 prompts the user to perform fingerprint registration. The fingerprint detection unit 104 conveys the fingerprints of the user to the fingerprint authentication determination unit 111. The fingerprint authentication determination unit 111 registers the fingerprints in the fingerprint registration unit 120.

Next, the fingerprint authentication determination unit 111 registers the fingerprints in association with "WA-123016". As a result of this processing, the character string "WA-123016" is deleted from the normal candidates and is registered as a private candidate.

Even using this processing, the user is able to register his or her own fingerprints in association with private candidates.

Accordingly, since the private information of the user can be protected, privacy is protected similarly to the above-mentioned utilization method.

Second Embodiment

Figure 5:
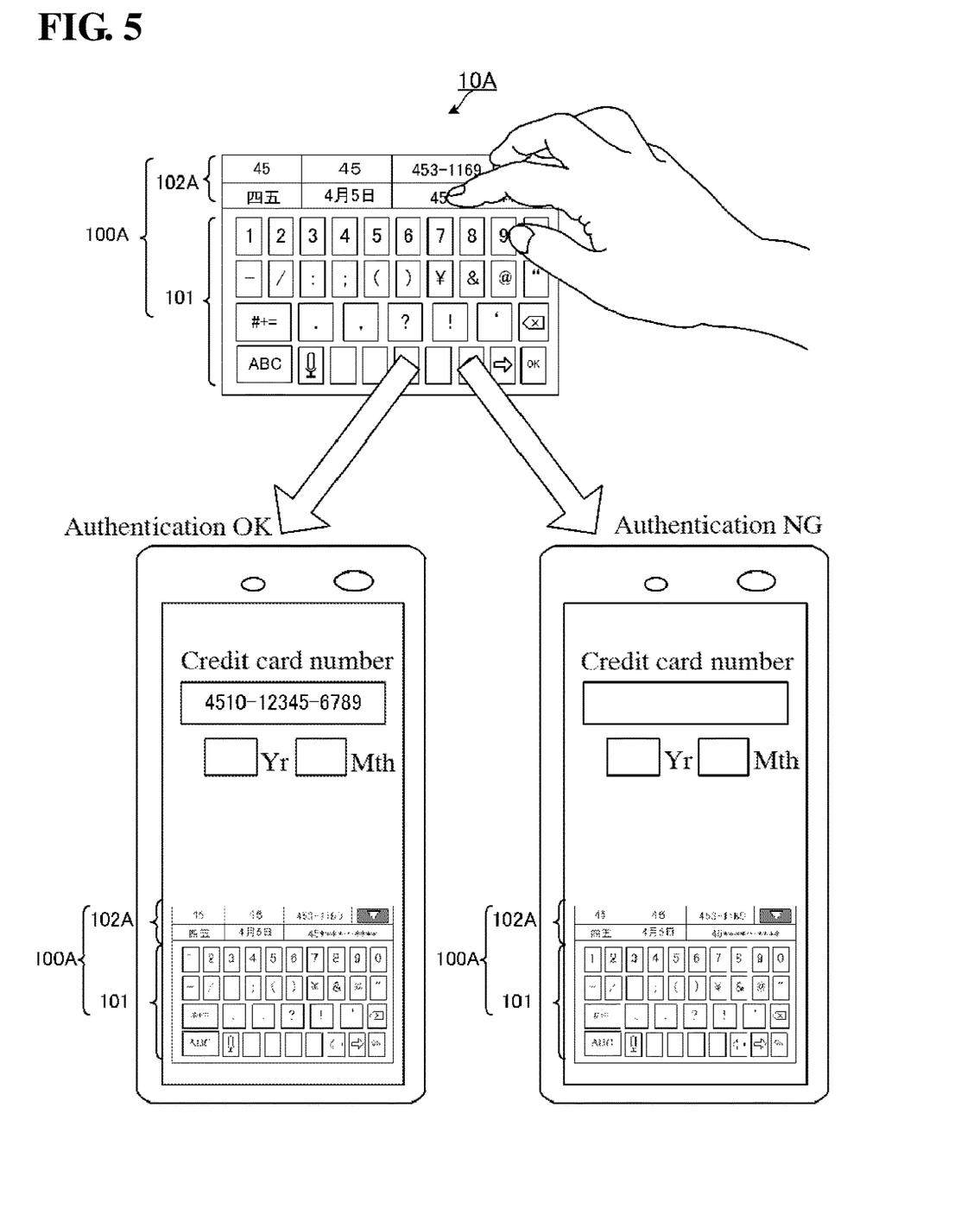
FIG. 5 is a schematic diagram illustrating an operation unit according to a second embodiment.
Figure 6:
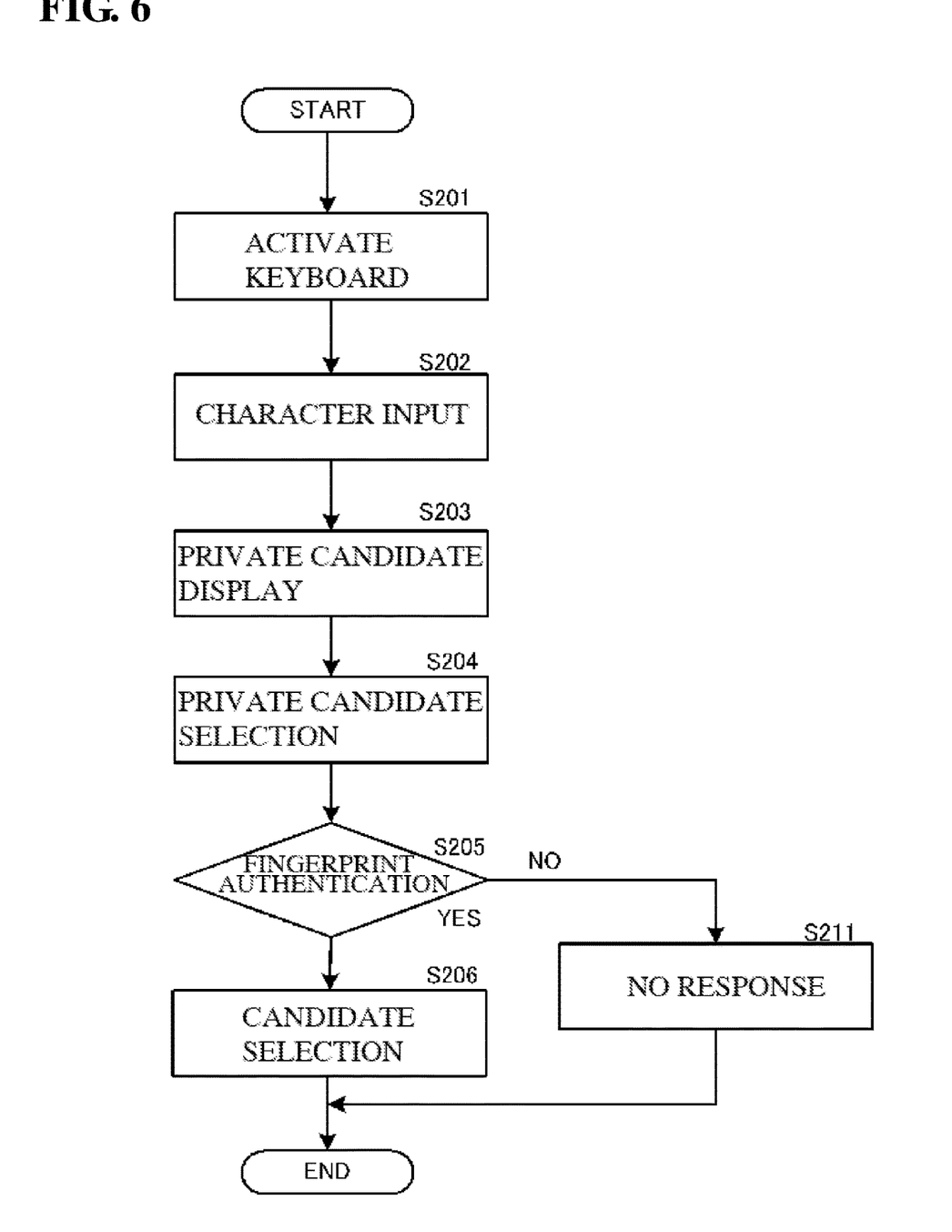
FIG. 6 is a diagram illustrating a flowchart for performing character input according to a second embodiment.

A character input device, a character input method and a character input program according to a second embodiment will be described, with reference to the drawings. FIG. 5 is a schematic diagram of an operation unit according to a second embodiment. FIG. 6 is a flowchart for performing character input according to a second embodiment. Note that the functional configuration in a second embodiment is similar to the configuration of FIG. 1 shown in a first embodiment.

As shown in FIG. 5, a character input device 10A according to a second embodiment differs from the character input device 10 according to a first embodiment in the processing of a candidate display unit 102A. The other processing of the character input device 10A is similar to the character input device 10, and description of similar points will be omitted. Also, it is assumed that the character input device 10A has been activated by an application that is not included in one or more embodiments.

An operation unit 100A is provided with a software keyboard 101 and the candidate display unit 102A. Both normal candidates and private candidates are displayed on the candidate display unit 102A. Note that it is assumed that the credit card number "4510-123456-6789" is registered as a private candidate.

A procedure for utilizing private information at the time of performing character input will be described, using FIG. 5. For example, the user inputs the credit card number. The user operates the software keyboard 101 with his or her finger and inputs "45". The operation detection unit 103 conveys the input operation to the fingerprint authentication determination unit 111. The candidate output unit 112 extracts the result of having searched the private information saving unit 130 and the dictionary data unit 140, and displays both private candidates and normal candidates on the candidate display unit 102A. The candidate output unit 112 displays private candidates with part thereof concealed by replacement with asterisks "*". The candidate output unit 112, however, directly displays normal candidates.

The user selects the character string "45* . . . *" displayed on the candidate display unit 102A. At the time of this operation, the fingerprint detection unit 104 detects the fingerprints of the user. First, the fingerprint authentication determination unit 111 searches as to whether the fingerprints of the user are registered in the fingerprint registration unit 120.

In the case where the fingerprints are registered in the fingerprint registration unit 120 (in the case of fingerprint authentication OK), the fingerprint authentication determination unit 111 conveys the credit card number "4510-123456-6789" to the character output unit 150. The character output unit 150 outputs this data to an external application.

In the case where the fingerprints are not registered in the fingerprint registration unit 120 (in the case of fingerprint authentication NG), the fingerprint authentication determination unit 111 ends the processing without performing data transmission to the character output unit 150.

As a result of this processing, it can be determined whether to transmit a character string to an external application, based on the fingerprints of the user, even in the case where private information is displayed as a prediction candidate. Furthermore, since only part of the character string of the private candidate is displayed, privacy can be protected.

Accordingly, since private information of the user can be protected, privacy is protected, even in the case where the user of a mobile terminal or the like changes.

Note that, in the abovementioned description, a mode in which the respective processing is executed by individual functional units was shown. However, the abovementioned processing may be realized and stored in the form of a program, and the program may be executed by a computational processing device such as a CPU. In this case, the flow of FIG. 6 need only be executed.

FIG. 6 is a flowchart of a character input method according to a second embodiment. The computational processing device accepts activation of the software keyboard (S201). The computational processing device accepts an operation of the user inputting a character with his or her finger using the software keyboard (S202). The computational processing device searches for private information of the user, and, in the case where a character string to serve as a candidate exists, displays a private candidate in a concealed manner (S203). The computational processing device accepts an operation selecting the private candidate of the user (S204). The computational processing device detects the fingerprints of the user and authenticates whether the fingerprints are registered. If the fingerprints are registered (S205: Yes), the computational processing device outputs the private candidate selected by the user (S206).

If the fingerprints are not registered (S205: No), the computational processing device does not respond, even when the user selects the private candidate, and does not execute selection processing (S211).

Note that although, in the above embodiments, the case where the processing is activated by an external application that is not included in one or more embodiments was described, it is also possible for the processing of to be executed independently.

The invention claimed is:

1. A character input device, comprising:
an operation unit configured to accept key input, and to display and accept selection of a prediction candidate that depends on a result of the key input; and
a processor configured with a program to perform operations comprising operation as a character input determining unit configured to:
determine an input character, using the result of the key input; or
determine a selection result of the prediction candidate, using the result of the key input to accept the selection of the prediction candidate from one or more prediction candidates, wherein
the processor is configured with the program to perform operations such that operation as the character input determining unit comprises operation the character input determining unit that:
executes fingerprint authentication of a fingerprint at a time of accepting the key input, or at a time of accepting the selection of the prediction candidate,
in response to successfully authenticating the fingerprint at the time accepting the key input, displays private information associated with the authenticated fingerprint,
in response to being unable to successfully authenticate the fingerprint at the time of accepting the key input, displays information other than the private information, and
in response to successfully authenticating the fingerprint at the time of selecting the prediction candidate, outputs a character string comprising private information associated with the selection result of the prediction candidate.

2. The character input device according to claim 1, wherein:
the operation unit comprises an operation surface; and
the processor is configured with the program to perform operations such that operation as the character input determining unit comprises operation as the character input determining unit that executes the fingerprint authentication, based on contact on the operation surface.

3. The character input device according to claim 1, wherein:
the operation unit comprises a candidate display unit;
the processor is configured with the program to perform operations further comprising operation as a private information saving unit in which the private information is saved; and
the processor is configured with the program to perform operations such that operation as the character input determining unit comprises operation as the character input determining unit that, in response to the fingerprint authentication at the time of accepting the key input being successful, displays a private candidate of the private information saved in the private information saving unit on the candidate display unit.

4. The character input device according to claim 2, wherein:
the operation unit comprises a candidate display unit;
the processor is configured with the program to perform operations further comprising operation as a private information saving unit in which the private information is saved; and
the processor is configured with the program to perform operations such that operation as the character input determining unit comprises operation as the character input determining unit that, in response to the fingerprint authentication at the time of accepting the key input being successful, displays a private candidate of the private information saved in the private information saving unit on the candidate display unit.

5. The character input device according to claim 1, wherein:
the operation unit comprises a candidate display unit; and
the processor is configured with the program to perform operations such that operation as the character input determining unit comprises operation as the character input determining unit that displays the prediction candidate on the candidate display unit so as to be partly concealed, and, in response to the fingerprint authentication at the time of accepting the selection of the prediction candidate being successful, outputs the prediction candidate externally.

6. The character input device according to claim 2, wherein:
the operation unit comprises a candidate display unit; and
the processor is configured with the program to perform operations such that operation as the character input determining unit comprises operation as the character input determining unit that displays the prediction candidate on the candidate display unit so as to be partly concealed, and, in response to the fingerprint authentication at the time of accepting the selection of the prediction candidate being successful, outputs the prediction candidate externally.

7. A character input method according to which a computational processing device perform operations comprising:
accepting key input, and displaying and accepting selection of a prediction candidate that depends on a result of the key input; and
determining an input character, using the result of the key input; or
determining a selection result of the prediction candidate, using the result of the key input to display one or more prediction candidates, and accept the selection of the prediction candidate from the one or more displayed prediction candidates, wherein
fingerprint authentication of a fingerprint is executed at a time of accepting the key input, or at a time of accepting the selection of the prediction candidate;
in response to successfully authenticating the fingerprint at the time accepting the key input, displaying private information associated with the authenticated fingerprint,
in response to being unable to successfully authenticate the fingerprint at the time of accepting the key input, displaying information other than the private information, and
in response to successfully authenticating the fingerprint at the time of selecting the prediction candidate, outputting a character string comprising private information associated with the selection result of the prediction candidate.

8. A non-transitory computer-readable storage medium storing a character input program that causes a computational processing device to perform operations comprising:
accepting key input, and displaying and accepting selection of a prediction candidate that depends on a result of the key input; and
determining an input character, using the result of the key input; or
determining a selection result of the prediction candidate, using the result of the key input to display one or more prediction candidates, and accept the selection of the prediction candidate from the one or more displayed prediction candidates, wherein
fingerprint authentication of a fingerprint is executed at a time of accepting the key input, or at a time of accepting the selection of the prediction candidate;
in response to successfully authenticating the fingerprint at the time accepting the key input, displaying private information associated with the authenticated fingerprint,
in response to being unable to successfully authenticate the fingerprint at the time of accepting the key input, displaying information other than the private information, and
in response to successfully authenticating the fingerprint at the time of selecting the prediction candidate, outputting a character string comprising private information associated with the selection result of the prediction candidate.

* * * * *